United States Patent [19]

Little

[11] Patent Number: 4,740,859
[45] Date of Patent: Apr. 26, 1988

[54] TRANSIENT VOLTAGE SURGE SUPPRESSOR AND LINE SHORT MONITOR

[75] Inventor: Hercel A. Little, Hampton, Minn.

[73] Assignee: Leon A. Hoskamer, Minneapolis, Minn.

[21] Appl. No.: 865,143

[22] Filed: May 20, 1986

Related U.S. Application Data

[63] Continuation of Ser. No. 480,751, Mar. 31, 1983, which is a continuation of Ser. No. 323,110, Nov. 19, 1981, which is a continuation of Ser. No. 94,981, Nov. 16, 1979.

[51] Int. Cl.¹ .............................................. H02H 3/20
[52] U.S. Cl. ....................................... 361/56; 361/111
[58] Field of Search ....................... 361/54, 55, 56, 57, 361/33, 91, 110, 111, 118–120, 124

[56] References Cited

U.S. PATENT DOCUMENTS

| | | | |
|---|---|---|---|
| 3,456,572 | 12/1970 | Specht et al. | 361/56 X |
| 3,693,053 | 9/1972 | Anderson | 361/56 X |
| 3,840,781 | 10/1974 | Brown | 361/56 |
| 3,894,274 | 7/1975 | Rosenberry, Jr. | 361/56 X |
| 4,023,071 | 5/1977 | Fussell | 361/56 |
| 4,068,279 | 1/1978 | Byrnes | 361/111 X |
| 4,089,032 | 5/1978 | Dell Orfano | 361/111 X |
| 4,152,743 | 5/1979 | Comstock | 361/56 |
| 4,168,514 | 9/1979 | Howell | 361/56 |
| 4,191,985 | 3/1980 | Phillips, Jr. | 361/56 |

Primary Examiner—A. D. Pellinen
Assistant Examiner—A. Jonathan Wysocki
Attorney, Agent, or Firm—Lawrence M. Nawrocki

[57] ABSTRACT

A transient voltage surge suppressor and short circuit monitor unit in an alternating current transmission system includes a metallic case or casing into which lead lines connected to each of the power lines and to the neutral lines are introduced. The metallic case encompasses a series-connected varistor and fuse pair connected between each lead from an incoming alternating current power line and the lead from the neutral line. A series-connected neon lamp and limiting resistor pair inside of the case are connected across each varistor to be normally energized to give visual indication of the effectiveness and readiness of the suppressor to pass voltage surges above a predetermined maximum voltage to neutral, and to give visual indication that there is no short circuit between the power lines and the neutral line.

7 Claims, 1 Drawing Sheet

TRANSIENT VOLTAGE SURGE SUPPRESSOR AND LINE SHORT MONITOR

This is a continuation of application Ser. No. 480,751 filed on Mar. 31, 1983, which is a continuation of application Ser. No. 323,110 filed on Nov. 19, 1981, which is a continuation of application Ser. No. 094,981 filed on Nov. 16, 1979.

BACKGROUND OF THE INVENTION

1. Field of the Invention

This invention has relation to the use of surge suppressors in the form of varistors to prevent random and switching transients in incoming power transmission lines from reaching electrical equipment connected to those lines, and the use of normally activated neon glow tubes or other voltage drop indicators to constantly simultaneously indicate that these surge suppressor circuits are in operative condition and to indicate that there is no short circuit in such transmission lines.

2. Description of the Prior Art

In alternating current power systems, it is known to connect a varistor between an incoming power line and the ground, and it is known to provide a fuse in series with this varistor. Further, it is known to connect a pilot light between a power line and neutral or ground to indicate the presence or absence of electrical energy in that line. Before the present invention, however, there was no way to indicate in a single unit both that the surge suppressor was in condition to operate properly to protect against overload surges and that there was no short circuit in the power lines.

One obvious advantage of using a surge suppressor and nonshort circuit monitor unit is to protect the electrical equipment connected to the incoming transmission lines from surges which can be damaging to that equipment. A less obvious but very important advantage is to prevent such surges from adversely affecting the readings on the electric watt meter. Transient overload surges add nothing to the performance of line electrical equipment on the surging lines, but do cause the watt meter to register a higher wattage than is actually used by the equipment.

Most electrical fires start because of short circuits. A major advantage of a combined nonshort circuit monitor and surge suppressor unit is that it gives an instantaneous indication of a condition where the absence of a short circuit can no longer be assumed. This allows instant remedial action to be taken.

A further advantage is that the visual indicator indicates simultaneously both the fact that the surge suppressor function is in place and operative and the fact that the incoming power lines are not shorted to ground or neutral.

In the parent application, the following were cited by the Examiner as prior art.

U.S. Pat. No. 4,191,985 to Phillips, Jr. in March 1980;
U.S. Pat. No. 3,693,053 to Anderson in September 1972;
U.S. Pat. No. 4,023,071 to Russell in May 1977;
U.S. Pat. No. 4,089,032 to Orfano in May 1978; and
U.S. Pat. No. 3,894,274 to Rosenberry, Jr. in July 1975.

SUMMARY OF THE INVENTION

A transient voltage surge suppressor and line short monitor unit for use with an alternating current power transmission system including a ground or other neutral path and a plurality of incoming alternating current power lines connected to at least one electrical appliance being powered by that system includes a case or casing in which is located a current limiting device such as a varistor for each such incoming power line, and a circuit protective device such as fuse or circuit breaker for each such voltage limiting device. Leads from each power line and the neutral line extend to position inside the case. In the form of the invention shown, each such varistor and fuse are connected in series with each other and connected between a lead from one of the incoming power lines and a ground or neutral lead line. A voltage drop indicator such as a neon lamp is also positioned in the casing and is connected in parallel with each of the varistors. The lamp can be observed from outside the case or casing.

In operation, when a transient voltage surge of over a predetermined maximum voltage occurs between any one of the incoming alternating current power transmission lines and a neutral path such as ground, the voltage limiting device will go into conduction to limit to a predetermined maximum, the voltage between that tranmission line and the neutral path. At all other times, the voltage drop across the voltage limiting device (varistor in the form of the invention as shown) will be equal to the nominal alternting current voltage of the incoming line with respect to the neutral path, and the voltage drop indicator (neon lamp in the form of the invention as shown) will give an observable indication that such portion of the transient voltage surge suppressor is in operative condition and ready to limit any voltage surge as it may occur.

Should one or more of the incoming power lines become short circuited to ground or another neutral path anywhere along the power transmission system outside of the unit of the present invention, the voltage drop across the voltage drop indicator will disappear, and the voltage drop indicator (neon lamp in the form of the invention as shown) will cease giving its observable indication.

Should there by any discontinuity in any leg of the transient voltage surge suppressor/line short monitor unit, including opening of the circuit protective device (fuse in the form of the invention as shown), there will be no voltage drop across the voltage limiting device (varistor), and the voltage drop indicator (neon lamp) will not be operative.

Whether the voltage drop indicator becomes inoperative because the circuit protective device has been blown out, or because the power line protected by that device has been shorted to ground or other neutral path, this inoperativeness of the voltage limiting device gives an instant notification that at least one of the conditions for proper operation of the alternating current transmission system including the surge suppressor is no longer present. Remedial action can then be promptly undertaken.

DETAILED DESCRIPTION OF THE PREFERRED EMBODIMENTS

Figure 1:
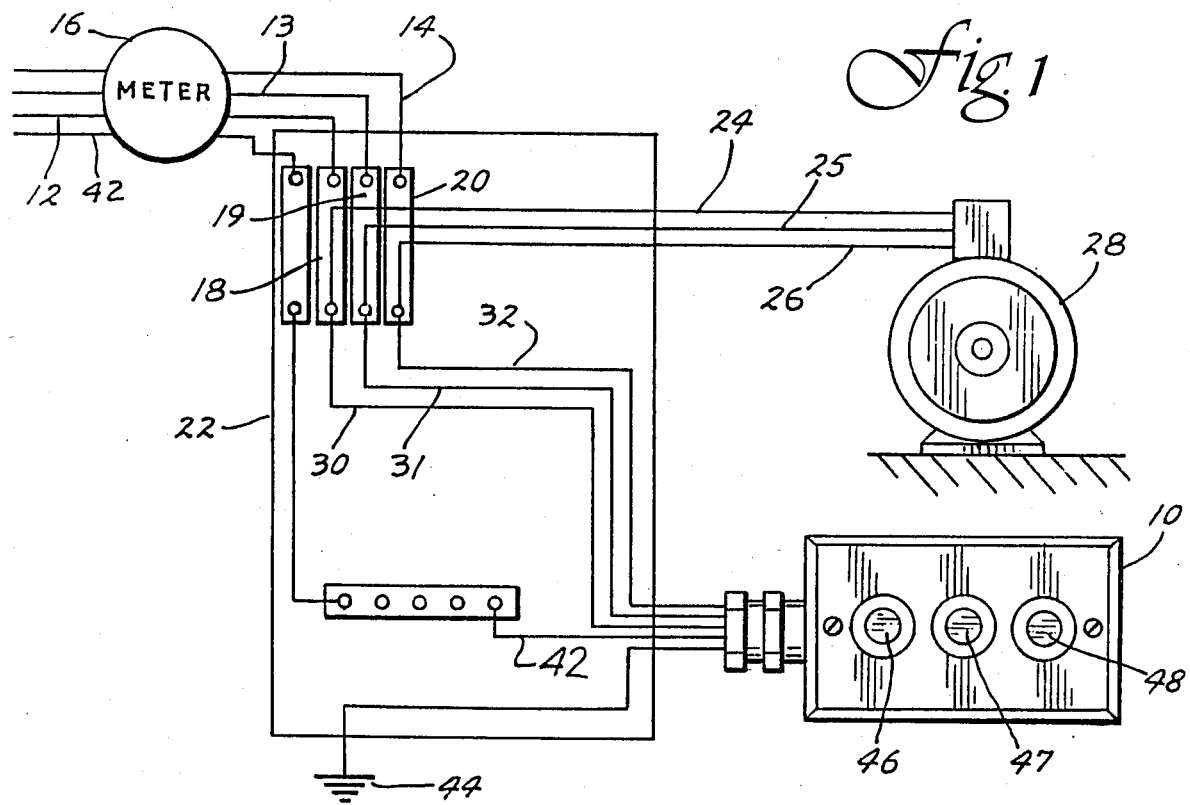
FIG. 1 is a partial schematic representation of a three-phase alternating current power transmission system feeding electrical equipment and a plan view of a surge suppressor/line short monitor unit of the present invention associated with that system.
Figure 2:
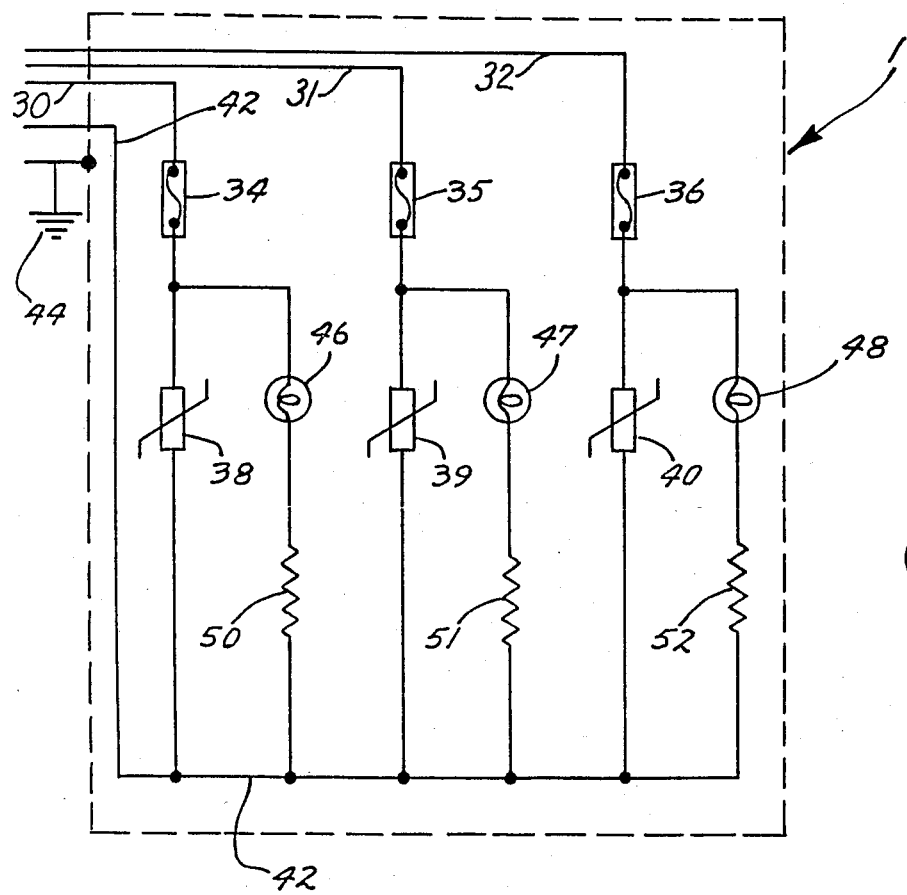
FIG. 2 is a schematic representation of the circuit diagram of the surge suppressor/line short monitor unit of FIG. 1.

A transient voltage surge suppressor and line short monitor unit of the present invention is shown in FIG. 1 to be associated with an incoming three-phase alternating current power transmission system including incoming power lines 12, 13 and 14 connected through an electric watt meter 16 to buss bars 18, 19 and 20, respectively, inside of a distribution panel 22. Connected to these buss bars by internal power lines 24, 25 and 26 is an electrical appliance load 28 typified in FIG. 1 as a three-phase electric motor.

The suppressor/monitor unit 10 has leads 30, 31 and 32 each connected with one of the buss bars 18, 19 and 20, respectively, and to circuit protective devices such as fuses, 34, 35 and 36 inside of the casing of the unit. In a 120/208 volt three-phase system where the suppression level is to be limited to 500/1000 volts peak, fuses rated at 28 amperes at 125 volts have been found to be satisfactory.

Each of these fuses is in turn connected to one of three voltage limiting devices such as varistors 38, 39 and 40, and the other end of each of these varistors is connected to a neutral line 42. A ground connection is indicated at 44. Varistors which limit the voltage between the buss bars 18, 19 and 20 and neutral to 500 volts have been found to be satisfactory.

Voltage drop indicators such as neon lamps 46, 47 and 48 are each connected in series with one of three circuit limiting devices such as resistors 50, 51 and 52, respectively, and each lamp/resistor pair is connected across one of the varistors to neutral line 42. Resistors having a resistance of approximately 30K ohms have been round to be satisfactory.

In operation, when a transient voltage surge of over 500 volts occurs between one or more of the buss bars 18, 19 and 20 and neutral line 42, the varistor associated with such buss bar will conduct to limit the voltage between the buss bar and the neutral line to a maximum of 500 volts, thus limiting the amount of erroneous watt meter reading which can be generated, and also at the same time limiting the peak surge voltage to the electrical motor 28 between any two internal power lines to 1000 volts.

The presence of this surge in the power line and consequently the momentary conduction of the varistor to limit the maximum voltage may be indicated by a momentary flicker of the associated neon lamp.

At any time when the incoming current transmission system is energized, and one of the incoming power lines 12, 13 or 14, the buss bars 18, 19 or 20, or the internal power lines 24, 25 or 26 becomes shorted to neutral or ground, there will no longer be a voltage drop across the fuse/varistor pair associated with that leg of the transmission line. Accordingly, there will be no voltage drop across the varistor and across the lamp/resistor pair connected across the varistor. Thus the neon lamp or bulb will not be energized and will go out and will remain out for so long as such a short circuit is present.

At all times when no surge is present on the power line due to the presence of a voltage over the predetermined maximum of 500 volts, for example, and when no such short circuit is present, the three neon lamps 46, 47 and 48 will be lighted and will indicate that the surge suppressor is effectively standing by to handle any transient voltage surges which may occur, and to indicate that there is no short circuit of any of the three power line legs of the system.

A visual inspection can be maintained of the suppressor/monitor unit 10, and as long as these neon lamps are lighted, the inspector is assured that any spurious meter readings due to transients are being limited and that no transient electromotive force exceeding 500 volts from line to neutral is being transmitted to the appliance protected by the surge suppressor. The inspector is also assured that there is no short circuit present in the power lines themselves.

When any one or more of these neon lamps go out, immediate remedial action can be taken, first to determine whether there is a short circuit of one of the lines to ground or other netural path, and then to see if one of the fuses 34, 35 or 36 has been blown.

Although the present invention has been described with reference to preferred embodiments, workers skilled in the art will recognize that changes may be made in form and detail without departing from the spirit and scope of the invention.

What is claimed is:

1. Apparatus for suppressing surges and monitoring for line shorts in an alternating current power transmission system including a neutral path and a plurality of incoming alternating current power lines connected to an electrical load being powered by that system, said apparatus including
   A. a unit casing;
   B. leads from each of said power lines and from said neutral path extending to positions inside of the casing;
   C. a voltage limiting device, associated with each incoming power line, inside of the casing, each of said voltage limiting devices being of the type which provides a low resistance path to current flow when subjected to voltage above a predetermined maximum;
   D. a circuit protective device, associated with each voltage limiting device, inside the casing, each of said circuit protective devices being of the type to open a normally closed line when a predetermined watt/time ratio is exceeded in that line;
   E. the normally closed line of each such circuit protective device being connected in series with one of said voltage limiting devices, each such series pair of a normally closed line and a voltage limiting device being connected between one of said incoming power line leads and said neutral path lead all within said casing; and
   F. a voltage drop indicator, associated with each voltage limiting device, in said casing, each of said voltage drop indicators being connected in parallel with a corresponding voltage limiting device and being situated to be observable from outside the casing.

2. The apparatus of claim 1 wherein said alternating current power transmission system includes three 3-phase alternating current power lines and a neutral path, and wherein there are three voltage limiting devices in series with the three circuit protective devices, and wherein each of said voltage limiting device/circuit protective device pair is connected between one of said incoming power line leads and said neutral path lead.

3. The apparatus of claim 2 wherein each such voltage limiting device is a varistor.

4. The apparatus of claim 3 wherein each said circuit protective device is a circuit breaker operatively responsive to the heat generated over a finite time period due to the passage of current through it.

5. The apparatus of claim 4 wherein each circuit breaker is a fuse.

6. The apparatus of claim 4 wherein each said voltage drop indicator is an inert gas glow lamp.

7. The apparatus of claim 6 wherein each inert gas glow lamp is a neon lamp.

* * * * *